Sept. 19, 1961 D. G. SCORGIE 3,000,569
MULTIPLIER OF QUANTITIES REPRESENTED BY
VOLTAGE AMPLITUDE AND FREQUENCY
Filed June 15, 1956
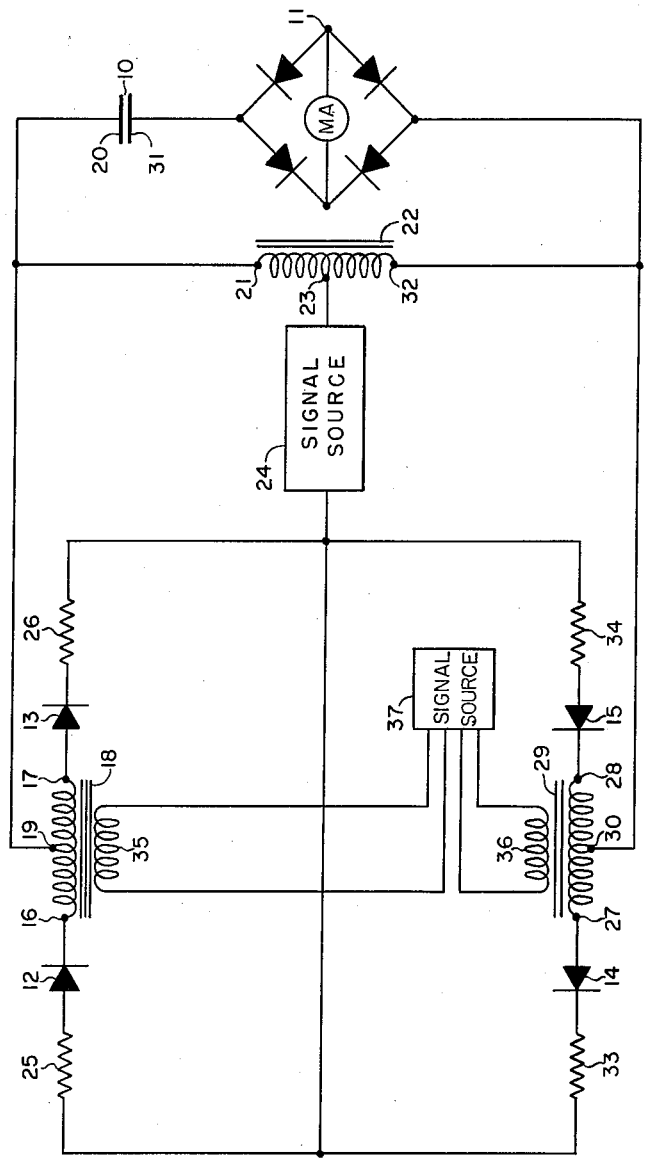
INVENTOR
DONALD G. SCORGIE
ATTORNEYS 3,000,569
MULTIPLIER OF QUANTITIES REPRESENTED BY
VOLTAGE AMPLITUDE AND FREQUENCY
Donald G. Scorgie, 356 Collins Ave., Pittsburgh, Pa.
Filed June 15, 1956, Ser. No. 591,770
6 Claims. (Cl. 235—194)
(Granted under Title 35, U.S. Code (1952), sec. 266)

The invention described herein may be manufactured and used by or for the Government of the United States of America for governmental purposes without the payment of any royalties thereon or therefor.

This invention relates in general to electrical computing devices and in particular to apparatus for multiplying two variable quantities which may be made available in the form of electrical signals.

In many applications of computing devices, a requirement for equipment capable of multiplying variable quantities is encountered. Where electrical quantities are involved it is not unusual that such quantities are of a dissimilar nature such as a voltage and a frequency, or the like. Previously available circuitry for performing such computations is complex and usually involves several FM and AM modulators, amplifiers, discriminators and detectors, with attendant problems of design, construction adjustment and maintenance.

It is accordingly an object of the present invention to provide a multiplier circuit which is characterized by simplicity and accuracy and which involves a minimum difficulty of adjustment and maintenance.

Another object of the present invention is to provide a computing device for deriving the product of a voltage and a frequency.

Another object of the present invention is to produce a current which has an average magnitude which is proportional to the product of a voltage and a frequency.

Other objects and many of the attendant advantages of this invention will be readily appreciated as the same becomes better understood by reference to the following detailed description when considered in connection with the accompanying drawings wherein:

The single figure indicates a typical embodiment of the features of the present invention.

In accordance with the basic teachings of the present invention a computer is provided wherein a storage device is charged and discharged at a rate proportional to a variable frequency quantity, this charging occurring between energy levels the separation of which is proportional to the magnitude of a variable amplitude quantity. Under such charging conditions, the average magnitude of energy flow through the storage device is proportional to the product of the frequency quantity and the amplitude quantity so that multiplication results.

A typical embodiment of the present invention is indicated in electrical form in the figure with a capacitance 10 forming the energy storage device. A meter device indicated generally by the numeral 11 is employed to measure the average magnitude of current flow in charging and discharging capacitance 10. This meter is typically a conventional D.C. milliameter cooperative with a bridge-type rectifier for operation in an alternating current system.

The charging and discharging of capacitance 10 is effected by suitable circuitry such as the ring modulator circuit employing unilateral impedance devices such as rectifiers 12, 13, 14, 15 having suitable current, voltage and frequency characteristics for the particular signals involved. Typically in many instances, these rectifiers could be germanium diodes.

Rectifiers 12 and 13 which are connected to conduct current in the direction from left to right in the figure are connected to opposite terminals 16 and 17 of the center tapped secondary winding of transformer 18. The secondary center terminal 19 of transformer 18 is connected to plate 20 of capacitance 10 and to one terminal 21 of a coupling transformer 22. The transformer 22 has a winding with an intermediate tap 23 connected through signal source 24 and limiting resistances 25 and 26 to rectifiers 12 and 13.

Rectifiers 14 and 15 which are connected to conduct current in the direction from right to left in the figure are connected to opposite terminals 27 and 28 of the center tapped secondary winding of transformer 29. The secondary center terminal 30 of transformer 29 is connected to plate 31 of capacitance 10 through the meter circuit 11 and direct to the terminal 32 of coupling transformer 22. Intermediate tap 23 of transformer 22, previously mentioned, is also connected through signal source 24 and resistances 33 and 34 to the rectifiers 14 and 15.

Primary windings 35 and 36 of transformers 18 and 29 are energized from a suitable source 37 of high frequency signal. Typically, square wave signals are applied to primary windings 35, 36 in such manner as to result in the development of equal amplitude signals across the secondary windings 16—19—17 and 27—30—28, the polarity being such that terminals 17 and 28 will simultaneously be driven with signals of similar polarity relative to the respective terminals 19 and 30.

The signal from source 37 is one of the input quantities which is to be multiplied, having a square wave frequency proportional typically in a 1:1 ratio, to the frequency quantity which is to be multiplied.

The signal from source 24 is the amplitude quantity to be multiplied. Typically, being an amplitude quantity, it is of a D.-C. nature, although it may be subject to variations which are of a frequency much lower than the signal from source 37. The amplitude of the signal from source 24 is typically proportional in some known ratio to the amplitude of the amplitude quantity to be multiplied.

In operation, the typical circuit effects the charge and discharge of capacitance 10 to plus and minus voltage levels equal to the amplitude of the signal from source 24. The frequency of the complete charge and discharge cycle is that of the source 37. The energy flow during each charge and discharge of capacitance 10 is proportional to the amplitude of the voltage level according to the relationship $$Q = 2CE$$

where:

Q is the energy in coulombs,
C is the capacitance of the capacitance 10 in farads
E is the peak voltage level in volts.

For a complete charge-discharge cycle through both a positive and a negative peak where the voltage levels are the same, the total energy flow in the circuit is $$Q = 4\ CE$$

where E is one-half the peak-to-peak voltage.

On an elapsed time basis the average magnitude of current flow is proportional to the frequency at which the complete charge-discharge-charge-discharge cycle recurs thus, $$I = Qf$$

where,

I is current in amps
f is frequency in cycle per second.

Substituting, $$I = 4\ CEf$$

The foregoing basic relationships indicate that an alternating charging current flow occurs in the leads to capacitance 10 which is proportional to the product of the amplitude of the voltage from source 24 and the frequency of application of this amplitude signal.

The circuitry associated with the ring modulator of diode rectifiers 12, 13, 14, 15 controls the application of the amplitude signal to capacitance 10. By virtue of the equal polarity of the signals developed across the secondary windings 16, 19, 17 and 27, 30, 28 in the figure, and the opposite polarity of the rectifiers 12, 13 and 14, 15, current flow occurs in the upper ring including rectifiers 12, 13 in one polarity half cycle of the alternating signal from source 37 and in the lower ring including rectifiers 14, 15 in the opposite polarity half cycle of the alternating signal from source 37.

In the half cycle during which rectifiers 12, 13 are conductive, terminal 38 is effectively connected to terminal 21 of transformer 22 resulting in the application of the amplitude signal from source 24 in a first polarity between terminals 21 and 23 of transformer 22. Transformer 22 is typically a center-tapped auto-transformer thus an output voltage is developed across terminals 21, 32 which is of equal polarity but double amplitude relative to the signal applied between terminals 21, 23.

Similarly for opposing polarity portions of the signal from source 37 during which rectifiers 14, 15 are conductive and rectifiers 12, 13 non-conductive, terminal 38 is effectively connected to terminal 32 of transformer 22 resulting in the application of the amplitude signal of source 24 across the terminals 32—33 with the development of an output signal across terminals 21—32 which is of opposite polarity to the signal developed in the first instance wherein rectifiers 12—13 were conductive.

From the foregoing it is obvious that certain limitations exist, for example, for absolute proportionality, time constants involved must not cause significant reduction in the peak amplitude of the signal applied across capacitance 10. Alternatively if such requirement is not realized, special calibration of meter 11 may be necessary. In addition, the relative amplitude of the signals supplied from sources 37 and 24 must be properly selected to insure that within the amplitude range desired for signals from source 24, simultaneous conduction of rectifiers 12, 13 and 14, 15 does not occur.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A computing device comprising an electrical energy storage device, a source of electrical energy, switch means for connecting the storage device to the energy source in alternating polarity at a selected rate, and at a fixed duty cycle and means for indicating the alternating current flow through the storage device.

2. A computing device comprising an electrical energy storage device, a source of electrical energy, a modulator for connecting the storage device to the energy source in alternating polarity and at a fixed duty cycle, means connected to the modulator for driving said modulator to provide polarity alternation at a selected rate, and means for indicating the alternating current flow through the storage device.

3. A computing device for multiplying a frequency quantity and an amplitude quantity, comprising an electrical energy storage device, a source of electrical energy having an energy level proportional to the amplitude quantity, modulator means for alternately connecting the source of electrical energy to the energy storage device in opposing polarity at a rate proportional to the frequency quantity and at a fixed duty cycle, and a current responsive device connected in series with the energy storage device for indicating the average magnitude of flow of energy therein.

4. A computing device for multiplying a frequency quantity and an amplitude quantity, comprising a capacitance, a variable voltage power source having a voltage level proportional to the amplitude quantity, modulator means connecting the capacitance and power source in series and with selectable relative polarity, modulator drive means for controlling the rate of connection of the capacitance and power source in proportion to the frequency quantity, and a current responsive measuring device for indicating the average value of the magnitude of alternating charging current flow through the capacitance.

5. Apparatus for providing an output signal proportional to the product of input signals comprising, first and second transformers each having first and second windings, the first winding of each having a tap at an intermediate point thereof, a junction point, unilateral impedance means for connecting each end of the tapped winding of the transformers to said junction point, a first signal source, means for connecting the first signal source to the second windings of the transformers, a tapped impedance, a second signal source, means for connecting said impedance to the taps of the transformers, means for connecting the second signal source to the tap of the impedance and to said junction point, and measuring means connected across said impedance.

6. Apparatus for providing an output signal proportional to the product of input signals comprising, first and second transformers each having first and second windings, the first winding of each having a tap at an intermediate point thereof, a junction point, unilateral impedance means for connecting each end of the tapped winding of the transformers to said junction point, a first signal source, means for connecting the first signal source to the second windings of the transformers, a tapped impedance, a second signal source, means for connecting said impedance to the taps of the transformers, means for connecting the second signal source to the tap of the impedance and to said junction point, an energy storage device, and means including a current sensitive indicator for connecting said energy storage device across said impedance whereby said indicator provides an indication in dependency on the product of the signals from the signal sources.

References Cited in the file of this patent

UNITED STATES PATENTS

| 2,310,438 | Johnson | Feb. 9, 1943 |
| 2,449,077 | Lindenblad | Sept. 14, 1948 |
| 2,623,916 | Welz | Dec. 30, 1952 |
| 2,921,739 | Tolles | Jan. 19, 1960 |

OTHER REFERENCES

Cruft Electronics Staff-Electronic Circuits and Tubes (1947), McGraw-Hill Book Co. Inc., New York, pages 733 and 734 relied on.

Basis Electrical Measurements (Stout), 1950, p. 430.

RCA Review (Goldberg), Sept. 1952, pgs. 265–268.

Transactions of IRE Professional Group on Electronic Computers (Morrill et al.), Dec. 1952, pgs. 57 and 58.